United States Patent [19]
Fleming et al.

[11] Patent Number: 5,998,298
[45] Date of Patent: Dec. 7, 1999

[54] USE OF CHEMICAL-MECHANICAL POLISHING FOR FABRICATING PHOTONIC BANDGAP STRUCTURES

[75] Inventors: James G. Fleming; Shawn-Yu Lin; Dale L. Hetherington, all of Albuquerque; Bradley K. Smith, Edgewood, all of N. Mex.

[73] Assignee: Sandia Corporation, Albuquerque, N. Mex.

[21] Appl. No.: 09/067,614

[22] Filed: Apr. 28, 1998

[51] Int. Cl.$^6$ .................................................. H01L 33/00
[52] U.S. Cl. ........................ 438/692; 438/690; 438/691; 438/800; 257/17; 359/344
[58] Field of Search .................... 438/690, 691, 438/692, 693, 800, 959, 962; 257/17; 359/344

[56] References Cited

U.S. PATENT DOCUMENTS

| | | | |
|---|---|---|---|
| 5,245,466 | 9/1993 | Burns | 359/296 |
| 5,335,240 | 8/1994 | Ho | 372/39 |
| 5,365,541 | 11/1994 | Bullock | 372/99 |
| 5,386,215 | 1/1995 | Brown | 343/795 |
| 5,406,573 | 4/1995 | Ozbay et al. . | |
| 5,440,421 | 8/1995 | Fan | 359/344 |
| 5,541,613 | 7/1996 | Lam | 343/792.5 |
| 5,541,614 | 7/1996 | Lam | 343/792.5 |
| 5,559,825 | 9/1996 | Scalora | 372/96 |
| 5,600,342 | 2/1997 | Pikulski | 343/909 |
| 5,600,483 | 2/1997 | Fan | 359/344 |
| 5,614,919 | 3/1997 | Pikulski | 343/909 |
| 5,617,445 | 4/1997 | Jewell | 372/96 |
| 5,679,604 | 10/1997 | Pikulski | 437/188 |
| 5,684,817 | 11/1997 | Houdre | 372/45 |
| 5,689,275 | 11/1997 | Moore | 343/786 |

OTHER PUBLICATIONS

K.M. Ho, C.T. Chan, C.M. Soukoulis, R. Biswas and M. Sigalas, "Photonic Band Gaps in Three Dimensions: New Layer–By–Layer Periodic Structures," *Solid State Communications*, vol. 89, pp. 413–416, 1994.

C.M. Soukoulis, "Photonic Band Gap Materials: The "Semiconductors" of the Future?", *Physica Scripta*, vol. T66, pp. 146–150, 1996.

*Primary Examiner*—Charles Bowers
*Assistant Examiner*—K Christianson
*Attorney, Agent, or Firm*—John P. Hohimer

[57] ABSTRACT

A method is disclosed for fabricating a two- or three-dimensional photonic bandgap structure (also termed a photonic crystal, photonic lattice, or photonic dielectric structure). The method uses microelectronic integrated circuit (IC) processes to fabricate the photonic bandgap structure directly upon a silicon substrate. One or more layers of arrayed elements used to form the structure are deposited and patterned, with chemical-mechanical polishing being used to planarize each layer for uniformity and a precise vertical tolerancing of the layer. The use of chemical-mechanical planarization allows the photonic bandgap structure to be formed over a large area with a layer uniformity of about two-percent. Air-gap photonic bandgap structures can also be formed by removing a spacer material separating the arrayed elements by selective etching. The method is useful for fabricating photonic bandgap structures including Fabry-Perot resonators and optical filters for use at wavelengths in the range of about 0.2–20 $\mu$m.

47 Claims, 7 Drawing Sheets

USE OF CHEMICAL-MECHANICAL POLISHING FOR FABRICATING PHOTONIC BANDGAP STRUCTURES

GOVERNMENT RIGHTS

This invention was made with Government support under Contract No. DE-AC04-94AL85000 awarded by the U.S. Department of Energy. The Government has certain rights in the invention.

FIELD OF THE INVENTION

The present invention relates generally to photonic bandgap structures (also termed photonic crystals, photonic lattices or periodic dielectric structures), and in particular to a method for fabricating a photonic bandgap structure wherein a chemical-mechanical polishing step is used to planarize one or more layers of deposited material wherefrom the photonic bandgap structure is formed.

BACKGROUND OF THE INVENTION

Photonic bandgap structures are currently being investigated for electromagnetic (EM) wave applications. Such photonic bandgap structures have a two- or three-dimensional periodic array structure in which the propagation of EM waves is governed by band-structure types of dispersion relationships. These photonic bandgap structures provide electromagnetic analogs to electron-wave behavior in crystals, with electron-wave concepts such as reciprocal space, Brillouin zones, dispersion relations, Bloch wave functions, van Hove singularities and tunneling having electromagnetic counterparts in photonic bandgap structures. This will enable the development of many new and improved types of photonic bandgap devices, including devices in which optical modes, spontaneous emission, and zero-point fluctuations are greatly reduced or inhibited. Photonic bandgap structures can also be formed with local disturbances in the periodic array structure, thereby generating defect or cavity modes with frequencies within a forbidden bandgap, for use in forming high-Q resonators or filters.

Photonic bandgap structures can be formed for use in the microwave or millimeter-wave regions of the spectrum by conventional machining processes (e.g. drilling or milling processes) or by laser ablative machining. For applications in the micron to sub-micron wavelength ranges, there is a need for improved fabrication processes that overcome accuracy and reproducibility limitations of conventional machining and laser ablation. For forming such micron or sub-micron range photonic bandgap structures, microelectronic fabrication processes are to be preferred as suggested, for example, in U.S. Pat. No. 5,335,240 to Ho et al.

However, variations in topography have been problematic when trying to form photonic bandgap structures using microelectronic fabrication processes heretofore. Successive deposition and patterning steps can result in an increasingly severe topography which builds up as each succeeding layer of a photonic bandgap structure is formed using conventional microelectronic deposition and patterning processes. This can limit the number of layers in a photonic bandgap structure formed by microelectronic processes or otherwise degrade performance of the completed structure due to variations in vertical dimensioning of the elements formed within different layers of the structure. What is needed is a method for fabricating a photonic bandgap structure that provides for each, and preferably every, layer of elements in the structure to be formed to precise vertical tolerances and that substantially eliminates any topographic buildup during formation of the structure.

An advantage of the fabrication method of the present invention is that a chemical-mechanical polishing step can be used to planarize each layer of a photonic bandgap structure, thereby providing a precise vertical tolerancing for the layer and eliminating any buildup of topographic variations across the layer.

Another advantage of the fabrication method of the present invention is that photonic bandgap structures can be formed with elements having critical dimensions in the range of several tens of microns down to a fraction of a micron (i.e. sub-micron).

A further advantage of the fabrication method of the present invention is that a photonic bandgap structure having a large area of several square centimeters or more can be formed with substantially uniform characteristics.

Yet another advantage is that microelectronics batch processing can be used to form a large of photonic bandgap structures with substantially identical characteristics.

Still another advantage is that the fabrication method of the present invention can be adapted to form either two- or three-dimensional photonic bandgap structures.

These and other advantages of the method of the present invention will become evident to those skilled in the art.

SUMMARY OF THE INVENTION

The present invention relates to a method for fabricating a photonic bandgap structure that comprises forming one or more layers of spaced elements; and planarizing each layer of the spaced elements by chemical-mechanical polishing after formation of that layer. The layers of spaced elements comprising the photonic bandgap structure can be formed directly on a substrate (e.g. a silicon substrate) using microelectronic integrated circuit (IC) processes.

Each of the layers can be formed by depositing a layer of a first material, patterning the layer of first material by etching to form an array of shaped openings therein, and depositing a second material to partially or completely cover the first material and to overfill all or a majority of the shaped openings. The second material can then be planarized by chemical-mechanical polishing to remove the second material at least down to the level of the underlying first material. One of the first and second materials is used to form the spaced elements, and the other of the materials forms a spacer material separating or surrounding the elements. The spacer material can optionally be removed by a subsequent selective etching process step (e.g. using an HF/water solution).

The steps for forming each layer of the photonic bandgap structure can be repeated a number of times to form a three-dimensional photonic bandgap structure. In some preferred embodiments of the present invention, the shaped openings in adjacent layers are laterally offset (e.g. by a distance of about one-half the spacing between adjacent shaped openings in the array) and/or rotated by a predetermined angle (e.g. 90°). Additionally, a third material having an index of refraction, $n_3$, different from the refractive index of the material used to form the spaced elements can be deposited into a minority of the shaped openings to form impurity sites (i.e. impurity doping) at selected positions in the photonic bandgap structure for advantageously altering a light-propagation characteristic of the structure. The impurity doping can be used to provide optical gain or to serve as a tunable electro-optical material (e.g. by using tantalum oxide as the third material).

The first and second materials have differing indices of refraction, $n_1$ and $n_2$ respectively, and can be selected from materials such as polycrystalline silicon, amorphous silicon, silicon nitride, silicon dioxide and silicate glass that are compatible with microelectronics processing. These materials can be deposited by chemical vapor deposition, and patterned by reactive ion etching. Additionally, whichever material that is not used to form the elements of the photonic bandgap structure can be optionally removed by selective etching to form an air-gap structure having an increased refractive index contrast. When such an air-gap structure is formed, the spaced elements therein can be vertically interconnected for support (e.g. by rotating the elements in adjacent layers of the structure by 90° to provide contact and adhesion between the elements in the adjacent layers).

By planarizing each layer of the photonic bandgap structure using chemical-mechanical polishing, a precise vertical tolerancing of the layers can be achieved and problems in topography can be substantially eliminated. Furthermore, the method of the present invention can be applied to fabricating many different types of two-dimensional photonic bandgap structures (e.g. comprising a single layer of elements with light generally propagated in the plane of the layer), or three-dimensional photonic bandgap structures (e.g. by forming a plurality of stacked layers of elements with the light propagated in any direction, but generally in a direction parallel or perpendicular to the layers).

Additional advantages and novel features of the invention will become apparent to those skilled in the art upon examination of the following detailed description thereof when considered in conjunction with the accompanying drawings. The advantages of the invention can be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several aspects of the present invention and, together with the description, serve to explain the principles of the invention. The drawings are only for the purpose of illustrating preferred embodiments of the invention and are not to be construed as limiting the invention. In the drawings.

DETAILED DESCRIPTION OF THE INVENTION

Figure 1:
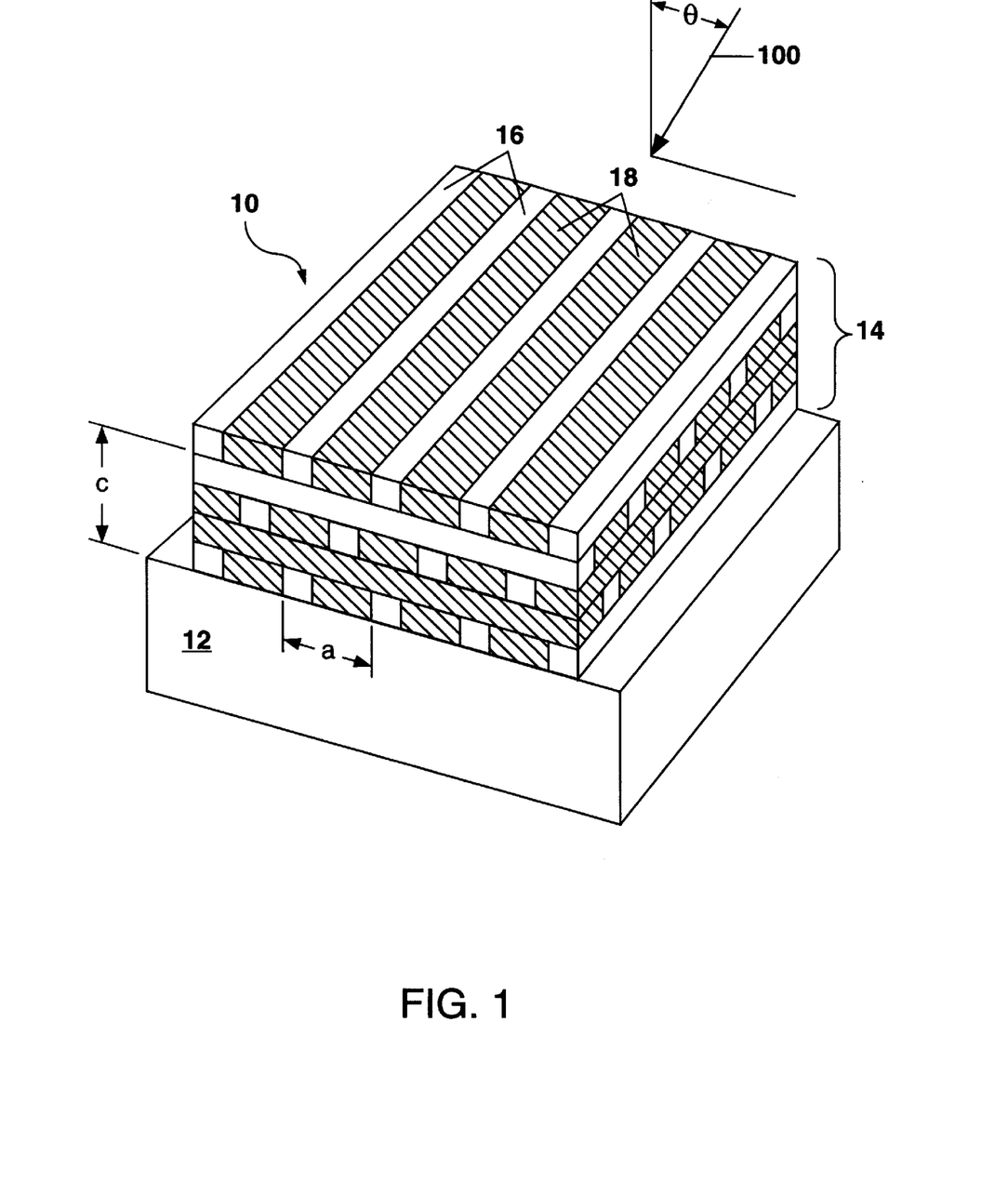
FIG. 1 shows schematically a perspective view of a first example of a photonic bandgap structure formed according to the present invention.

Referring to FIG. 1, there is shown schematically a perspective view of a first example of a photonic bandgap structure 10 formed on a substrate 12 according to the present invention. Although the term "photonic bandgap structure" is used throughout this disclosure, those skilled in the art will know that the photonic bandgap structure 10 can also be termed a photonic crystal, a photonic lattice, or a periodic dielectric structure.

In FIG. 1, the photonic bandgap structure 10 comprises a plurality of stacked layers 14 of spaced elements 16, with the spaced elements 16 in each layer 14 being formed in a predetermined arrangement. In each layer 14, adjacent spaced elements 16 are separated or surrounded by a spacer material 18, with the spacing between adjacent elements (denoted herein as "a") being selected depending upon a particular wavelength (i.e. a center wavelength) of light (e.g. a light beam 100 incident on the structure 10 at a predetermined angle θ) for use of the structure 10. The teachings of the present invention are particularly suitable for the fabrication of photonic bandgap structures 10 for use at wavelengths of light in the range from about 0.2–20 microns (i.e. with an effective optical spacing between adjacent elements 16 being in the range of 0.2–20 μm).

In the example of FIG. 1, each element 16 is a straight elongate member, with adjacent elements 16 in each layer 14 having longitudinal axes that are arranged parallel to each other. The elements 16 in each pair of adjacent layers 14 of the structure 10 are formed similarly but rotated by a predetermined angle (e.g. 90° as shown in FIG. 1). The elements 16 in every other layer 14 (i.e. alternating layers 14) in the example of FIG. 1 are oriented in the same direction, but are laterally offset by a distance substantially equal to one-half the spacing, a, between the elements 16. After four layers 14 of the photonic bandgap structure 10 in the example of FIG. 1 are formed, the arrangement of the spaced elements 16 in the stacked layers 14 is repeated, with a separation distance between the repeated elements 16 being denoted as "c". The photonic bandgap structure 10 in the example of FIG. 1 can be considered as having a lattice structure comprising a face-centered cubic (fcc) primitive unit cell with a basis of two elements 16 when $$\frac{c}{a} = \sqrt{2}$$

or alternately as having a face-centered tetragonal (fct) lattice structure for other values of a and c.

The spacer material 18 and the elements 16 are formed from different materials to provide a difference, $\Delta n = |n_2 - n_1|$, in index of refraction between the two materials. In a structure 10 such as that shown in FIG. 1, the materials used to form the elements 16 and spacer material 18 can be selected from such materials as polycrystalline silicon (also termed polysilicon), amorphous silicon, silicon nitride, silicon dioxide and silicate glasses that are compatible with microelectronics fabrication. Generally, the materials are selected to provide a refractive index difference, Δn, of generally about 2 or more between the elements 16 and the spacer material 18 (e.g. by using polysilicon with n=3.6 for the elements 16 and silicon dioxide with n=1.4–1.5 for the spacer material 18). The spacer material 18 preferably has a high transmission of light over a predetermined wavelength range for which the photonic bandgap structure 10 is to be used.

In some embodiments of the present invention, the spacer material 18 can be removed by selective etching after formation of the stacked layers 14. This is shown in a second example of the present invention in FIGS. 2a and 2b where the spacer material has been removed by selective etching and replaced with air thereby forming an air-gap structure 10. This can be done, for example, by using either polysilicon or silicon nitride to form the elements 16, and by using silicon dioxide or silicate glass to form the spacer material 18, with the spacer material 18 subsequently removed by selective etching using an HF/water solution. Such an air-gap structure 10 provides a higher refractive index contrast, Δn, than could otherwise be achieved. Additionally, an air-gap structure 10 allows the use of materials for forming the spaced elements 16 that have a lower index of refraction (e.g. silicon nitride with n=1.9; or a mixture of silicon nitride and silicon which can be used to provide a higher refractive index of about 1.9–2.5).

Figure 2A:
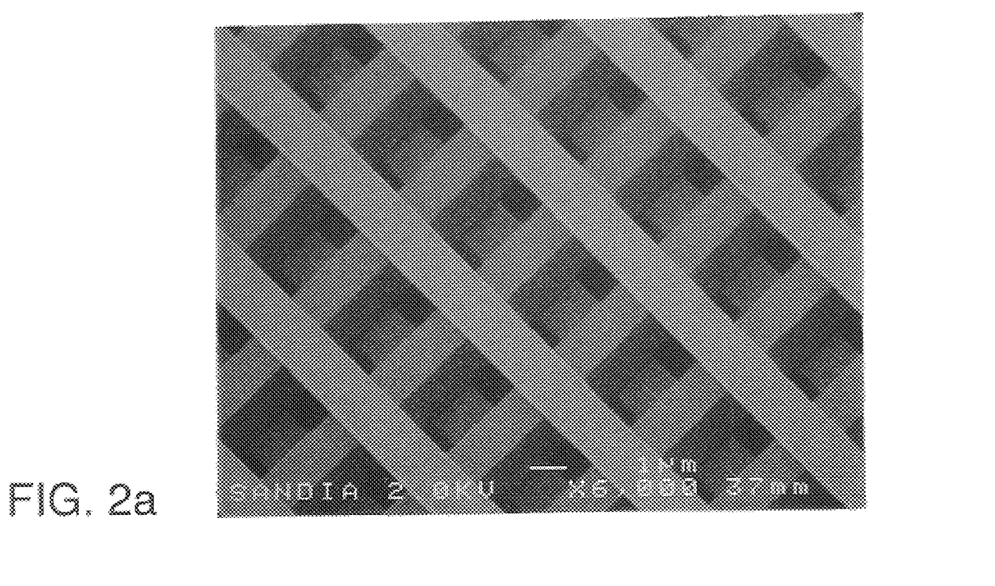
FIG. 2a shows a scanning electron microscope (SEM) photograph at 6000× magnification of a second example of a photonic bandgap structure similar to that of FIG. 1, but with the spacer material removed by etching to form an air-gap structure.

FIG. 2a shows a scanning electron microscope (SEM) photograph at 6000× magnification of the second example of a photonic bandgap structure 10 according to the present invention. In FIG. 2a, the photonic bandgap structure 10 can be formed identically to the first example in FIG. 1, with the spacer material 18 being removed by selective etching. In the second example of FIG. 2a, the elongate elements 16 are formed of polysilicon with an index of refraction, n=3.6; and the air-gap region between the elements 16 has an index of refraction, n=1, thereby providing an increased refractive index contrast of Δn=3.6 as compared with the first example of FIG. 1. The elements 16 in FIG. 2a have a width, w, of about 1.2 μm and a lateral spacing or pitch, a, between adjacent elements of about 4.3 μm, and a layer thickness of about 1.6 μm. This results in a filling fraction, w/a=0.28, which together with the refractive index contrast, Δn, determines a photonic bandgap over which the photonic density-of-states (DOS) vanishes so that the propagation of light is substantially reduced through the structure 10. The term "light" as used herein refers to electromagnetic energy (i.e. EM waves) of any particular wavelength, and in particular is intended to refer to wavelengths ranging from the ultraviolet through the infrared regions of the electromagnetic spectrum, especially over a wavelength range of about 0.2–20 μm.

The size and periodicity of the spaced elements 16 will, in general, depend upon a particular center wavelength, $\lambda_c$, of light for which the completed photonic bandgap structure 10 is designed. For example, the periodicity of the spaced elements 16 can be about an integer multiple of one-half the wavelength of the light to be propagated through the structure 10 or reflected therefrom. Additionally, a width and height of the spaced elements can be about one-quarter of the center wavelength. For elongate elements 16, a length of the elements 16 is preferably at least twice the center wavelength. It should be noted that dimensions of the photonic bandgap structure 10 must take into account the index of refraction, n, of each material forming the structure 10 to arrive at the periodicity and dimensions of the spaced elements 16. In the above example of FIGS. 2a and 2b, the center wavelength, $\lambda_c$, is about 11 μm.

Figure 2B:
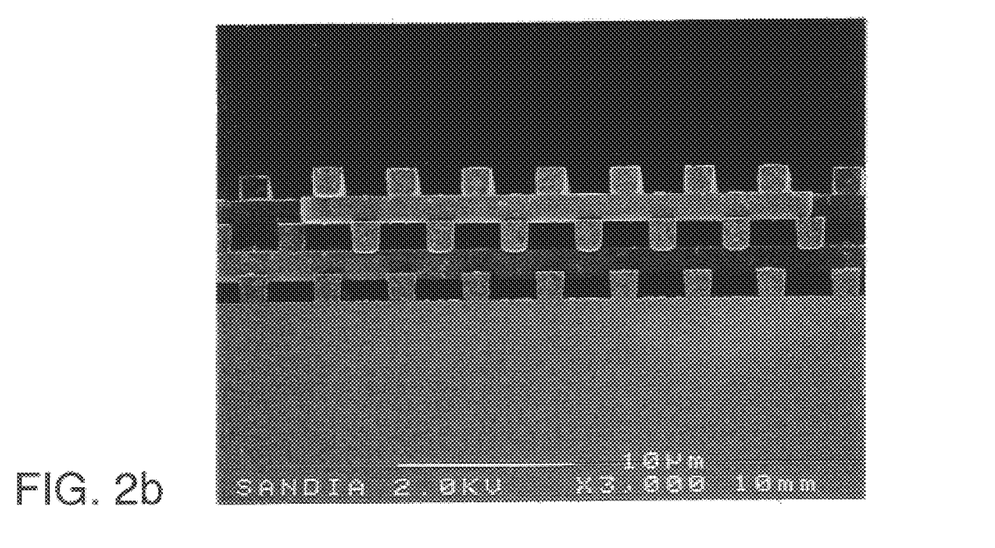
FIG. 2b shows an SEM photograph of a cross-section view of the photonic bandgap structure of FIG. 2a at a different magnification (3000×), showing the planarity and precise vertical tolerancing of the individual layers forming the structure.

FIG. 2a shows the straightness and uniformity of the elongate elements 16 that can be formed in each layer 14 of the photonic bandgap structure 10 with the fabrication method of the present invention. FIG. 2b shows an SEM photograph of a cross-section view of the 5-layer photonic bandgap structure of FIG. 2a at a lower magnification of 3000×. In FIG. 2b, each elongate element has a precise vertical tolerancing which is maintained across the substrate 12. On a 6-inch silicon wafer or substrate 12, the thickness of each layer 14 in the photonic bandgap structure 10 can be controlled to about two percent by chemical-mechanical polishing as will be described hereinafter. Such planarity of the layers 14 is particularly important when a number of stacked layers 14 are to be formed since topographic variations in the individual layers 14 can otherwise mount up with each succeeding layer 14, thereby degrading the uniformity and performance of a photonic bandgap structure.

FIGS. 3a–3h show a series of schematic cross-section views to illustrate the essential process steps according to the present invention for forming the photonic bandgap structures of FIGS. 1 and 2. Some process steps such as photolithographic masking have been omitted since these process steps are well understood in the art.

Figure 3A:
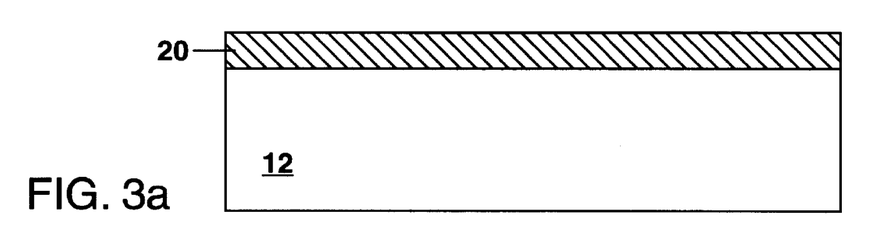
FIGS. 3a–3h show a series of process steps for forming the photonic bandgap structure of FIGS. 1 and 2 according to the present invention.

In FIG. 3a, a layer 20 of a first material (e.g. silicon dioxide or silicate glass) is blanket deposited over the substrate 12 to a predetermined layer thickness (e.g. about 0.1–2 μm). The deposition can be performed by a conventional chemical vapor deposition (CVD), or preferably by a low-pressure CVD (LPCVD) process (e.g. plasma-enhanced CVD also termed PECVD). The deposition temperature can be, for example, about 750° C. for depositing silicon dioxide or silicate glass. An example of a silicate glass that can be used according to the present invention is a TEOS-based glass deposited from the decomposition of tetraethyl orthosilicate by LPCVD and densified by high temperature processing.

Figure 3B:
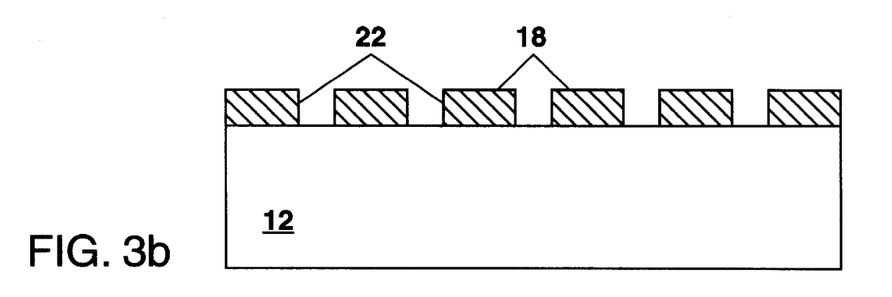

In FIG. 3b, the layer 20 of first material can patterned at the locations where the various elements 16 are to be formed. The patterning can be done by forming a photolithographic etch mask (not shown) over the layer 20 with a plurality of openings in the etch mask at the locations wherein the elements 16 are to be formed. An anisotropic etching step (e.g. using reactive ion etching) can then be used to etch the layer 20 exposed by the openings in the etch mask, thereby forming a one- or two-dimensional array of shaped openings 22 separated or surrounded by the remainder of the layer 20 which becomes the spacer material 18 described heretofore. The shaped openings 22 can be in the form of elongate trenches; or alternately each shaped opening 22 can have substantially equal lateral dimensions to form a cylindrical, elliptical or polygonal well (see FIG. 6).

The etching step is preferably performed to etch down completely through the layer 20 to provide a substantially planar bottom surface and vertical sidewalls for the shaped openings 22. The patterned first material, after stripping of the etch mask, forms the spacer material 18 as shown in FIG. 3b.

Figure 3C:
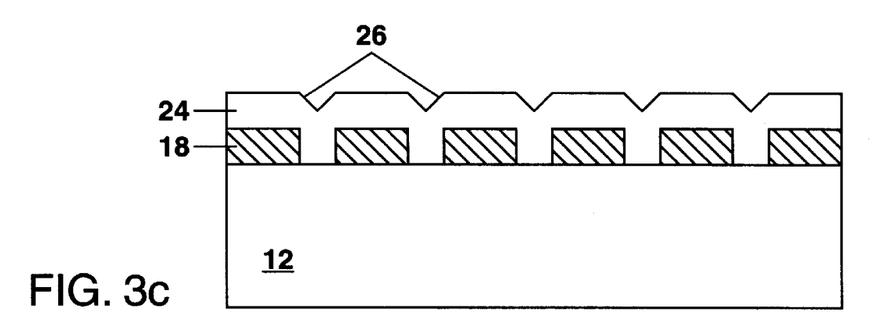
Figure 6:
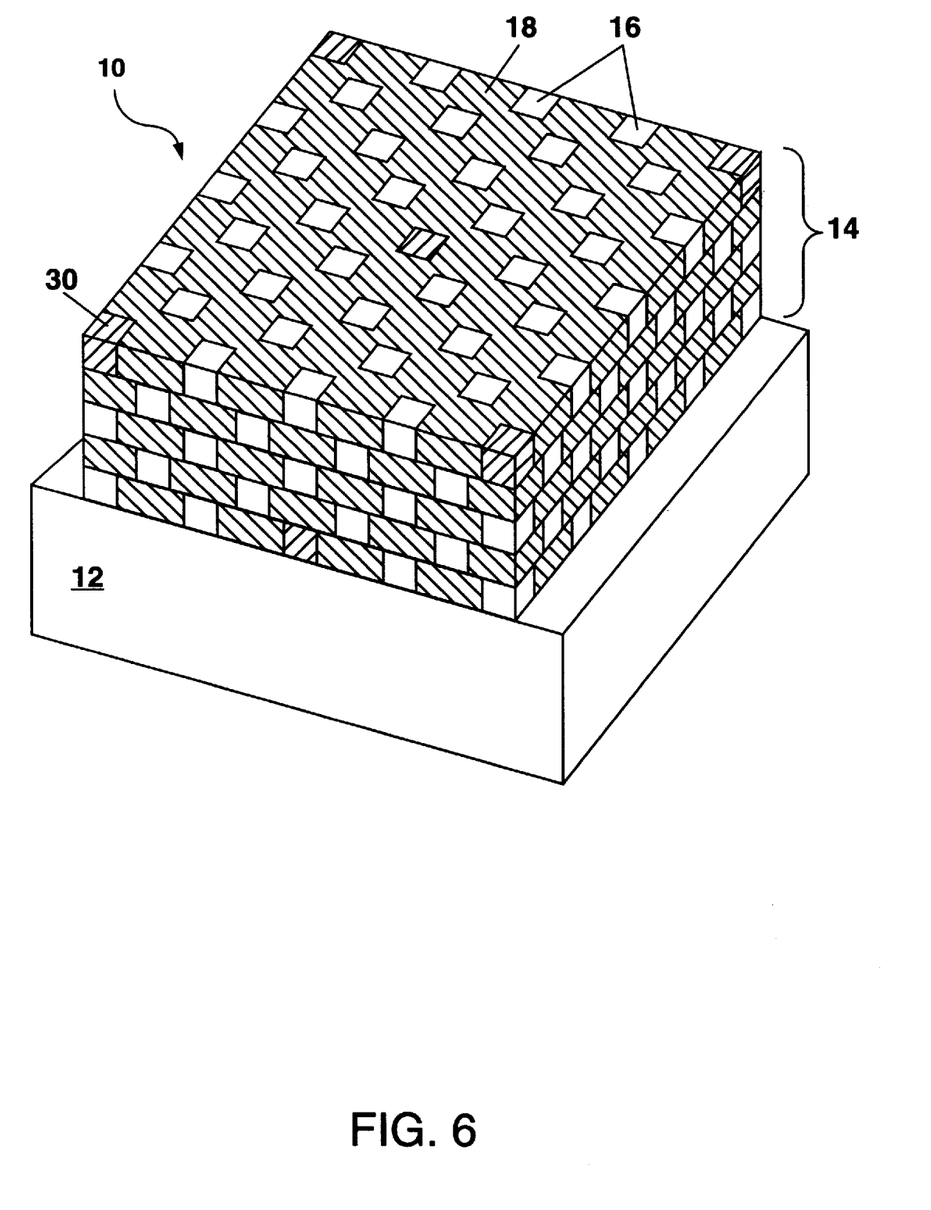
FIG. 6 shows schematically a perspective view of a third example of a photonic bandgap structure according to the present invention.

In FIG. 3c, a second material 24 (e.g. polysilicon) is deposited to cover the spacer material 18 to a layer thickness that is sufficient to overfill a majority or the entirety of the shaped openings 22. In the case of a polysilicon second material 24, deposition can be performed by LPCVD at a temperature of about 580° C. A minority of the shaped openings 22 can optionally be filled with a third material 30 as shown in FIG. 6 to form impurity sites in the photonic bandgap structure 10 as will be described hereinafter. Suitable masking can be used to deposit the third material 30 either before or after deposition of the second material 24. The second material 24 can be locally or globally deposited depending on a size of the photonic bandgap structure 10 (i.e. whether or not the structure 10 covers the entire surface of the substrate 12).

Deposition of the second material 24 to overfill the shaped openings 22 allows the use of a planarization step by chemical-mechanical polishing (CMP). This is essential to remove dimples or troughs 26 which occur due to filling in the shaped openings 22 with the second material 24. If not removed by the CMP step, such dimples or troughs 26 can degrade the topography with each successively formed layer 14, thereby adversely affecting the uniformity and performance of the photonic bandgap structure 10.

Figure 3D:
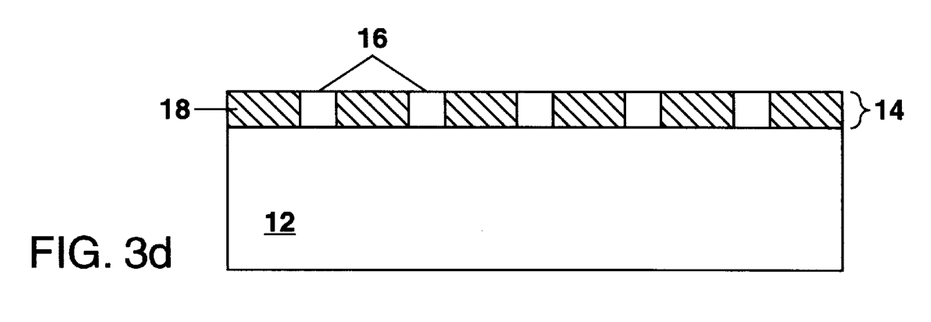

In FIG. 3d, chemical-mechanical polishing is used to remove the second material 24 down at least to the underlying spacer material 18 which is comprised of the first material, thereby completely removing the dimples or troughs 26. This completes formation of a first-formed of the layers 14 of the photonic bandgap structure 10 as shown in FIG. 3d, with the second material forming the elements 16 of the structure 10. The CMP step can also be used to precisely adjust the thickness of the layer 14 (e.g. by removing the first and second materials down to a predetermined thickness above the substrate 12) thereby forming the elements 16 to a precise vertical dimension (e.g. for controlling the separation distance, c, between the repeated elements 16 and determining, at least in part, the center wavelength, $\lambda_c$).

In some embodiments of the present invention, for example for forming a two-dimensional photonic bandgap structure 10 wherein a light beam 100 is propagated parallel to the substrate 12, a single layer 14 can be sufficient to form the structure 10 so that the fabrication is complete after the CMP process step in FIG. 3d. For these embodiments of the present invention, the CMP process step can be used to provide a planar surface for the single layer 14, thereby improving the uniformity of the elements 16. Additionally, the CMP process step can be used to precisely dimension a thickness of the layer 14 and elements 16 therein (e.g. to a predetermined fraction of the center wavelength, $\lambda_c$). Finally, for two-dimensional photonic bandgap structures 10 in which a light beam 100 is to be propagated parallel to the substrate 12, the single layer 14 of arrayed elements 16 can be sandwiched between a pair of unpatterned optical waveguide cladding layers (e.g. comprising a low-refractive-index material such as silicon dioxide or silicate glass) for optical confinement of the light beam 100 in the vertical direction.

The CMP step is performed with a CMP apparatus (not shown) which includes a moveable or rotatable polishing platen upon which a polishing pad is mounted. A rotatable wafer carrier is used to hold the substrate 12 with the second material 24 facing downward and to urge the substrate 12 into contact with the polishing pad by applied pressure. In the CMP process step, the second material 24 is polished away by contact with the polishing pad which has an abrasive and chemically-reactive slurry thereon. The rate at which the second material 24 is polished away can be controlled by such factors as the polish pad composition (i.e. resiliency of the pad), the slurry composition and temperature, rotational speeds of the polishing pad and the wafer carrier, and the downward pressure applied to the substrate 12.

If stress is present in the first-formed layer 14 as a result of deposition of the first and second materials, an optional high-temperature annealing step can be performed (e.g. at a temperature of about 1100° C. for several hours). The high-temperature annealing step can be performed after the CMP process step, and can be repeated after formation of each layer 14 of the photonic bandgap structure 10. This can be advantageous to reduce any buildup of stress in the photonic bandgap structure 10 (e.g. due to polysilicon) that could be problematic in maintaining the planarity of the layers 14 or which could result in deformation of the structure 10 if the spacer material 18 is later removed by a selective etching step (e.g. to form a structure 10 such as the second example of FIGS. 2a and 2b). It should be noted that although stress in polysilicon can be removed by the annealing step, the stress in other materials (e.g. silicon dioxide or silicate glass) may not be relieved.

Figure 3E:
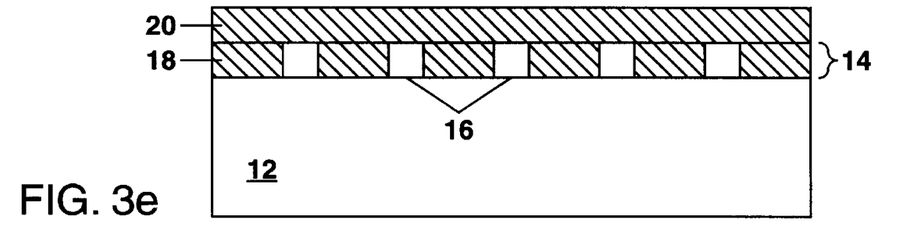

In FIG. 3e another layer of the second material 20 is deposited above the substrate 12 for use in fabricating a second-formed layer of the stacked layers 14 of the photonic bandgap structure 10. This second layer of the material 20 is patterned as described with reference to FIG. 3b, except that the etching mask is rotated at a predetermined angle or is laterally shifted relative to its previous use. As an example, by rotating the etching mask by an angle of 90°, the array of shaped openings can be used to form arrayed elongate elements 16 that are oriented perpendicularly to the elements 16 in the first-formed layer 14 as shown in FIGS. 1 and 2b. To complete the second-formed layer 14, the second material 24 is deposited as described with reference to FIG. 3c and planarized by CMP. To form other types of photonic bandgap structures 10 having a different lattice structure (i.e. a different crystal symmetry) the etching mask can be shifted (e.g. by one-half the spacing between adjacent elements 16 in each layer 14), or the etching mask can be both rotated at a predetermined angle and shifted by a predetermined lateral distance.

Figure 3F:
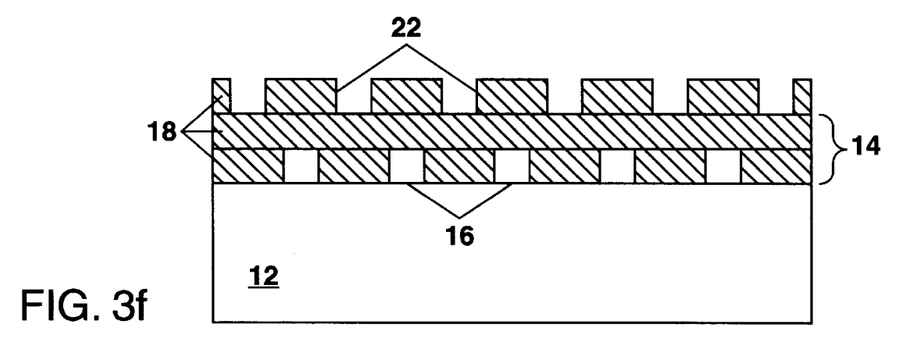

FIG. 3f shows a third-formed of the stacked layers 14 during fabrication thereof after depositing and patterning yet another layer of the first material 20 as described herebefore. In FIG. 3f, the shaped openings 22 in the third-formed layer can be oriented similar to the shaped openings 22 in the first-formed layer, but laterally offset by a distance substantially equal to one-half the spacing, a, between the elements 16 in each layer 14.

Figure 3G:
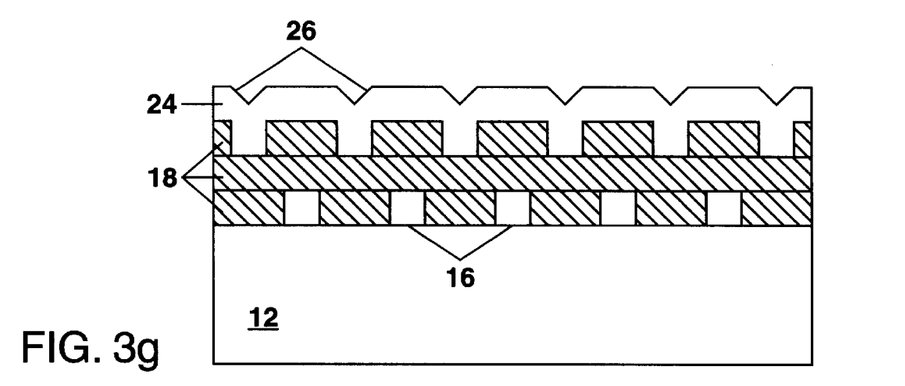
Figure 3H:
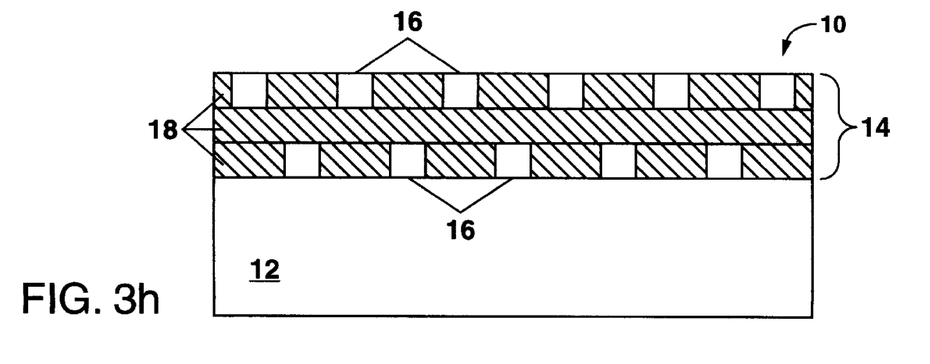

In FIG. 3g, the second material 24 is deposited to overfill the exposed openings 22 as described heretofore with reference to FIG. 3c. The second material 24 is then polished down at least to the level of the first material (i.e. the spacer material 18) using another CMP process step. FIG. 3h shows the photonic bandgap structure 10 after completion of three stacked layers 14. In this example of a photonic bandgap structure according to the present invention, a fourth-formed layer 14 can be fabricated using the process steps described heretofore. The fourth-formed layer 14 can be oriented similarly to the second-formed layer 14, but with the array of spaced elements 16 therein being laterally offset from the elements 16 in the second-formed layer 14 by a distance substantially equal to one-half the spacing, a (see FIG. 1). Additional stacked layers 14 can be formed according to the present invention by repeating the sequence of process steps starting with the arrangement of the first-formed layer 14.

After a predetermined number of stacked layers 14 have been formed, the spacer material can optionally be removed using a selective etchant. In the example of FIGS. 2a and 2b where the spaced elements 16 were formed of polysilicon and the spacer material was silicon dioxide, a selective etchant comprising hydrofluoric acid (HF) was used to remove the spacer material 18 without attacking the polysilicon. HF is also suitable for use as a selective etchant when the spacer material 18 comprises a silicate glass.

In other embodiments of the present invention, photonic bandgap structures 10 can be formed using silicon nitride to form the spaced elements 16. For these embodiments of the present invention, silicon dioxide or silicate glass can be used as the spacer material 18 (i.e. the first material), and later removed using a selective etchant comprising HF. Alternately, when silicon nitride is used to form the spaced elements 16, polysilicon can be used as the spacer material 18 and subsequently removed by an etchant that attacks polysilicon but which does not attack silicon nitride (e.g. a potassium hydroxide-based etchant).

Although the fabrication method described with reference to FIGS. 3a–3h is based on initially forming a patterned spacer material 18 with shaped openings 22 therebetween from the first material and subsequently filling in the shaped openings 22 with the second material to form the spaced elements 16, those skilled in the art will understand that the order of formation of the spacer material 18 and the shaped elements 16 can be reversed. This can be done by initially forming the shaped elements 16 depositing and patterning a layer of a first material (e.g. polysilicon or silicon nitride), and then depositing and planarizing a layer of a second material (e.g. silicon dioxide or silicate glass) to form the spacer material 18 and thereby complete a first-formed layer 14 of the photonic bandgap structure 10. Additional stacked layers 14 can be similarly formed, with the array of spaced elements 16 in each of the stacked layers 14 having a predetermined orientation to form a particular photonic bandgap structure 10.

Figure 4:
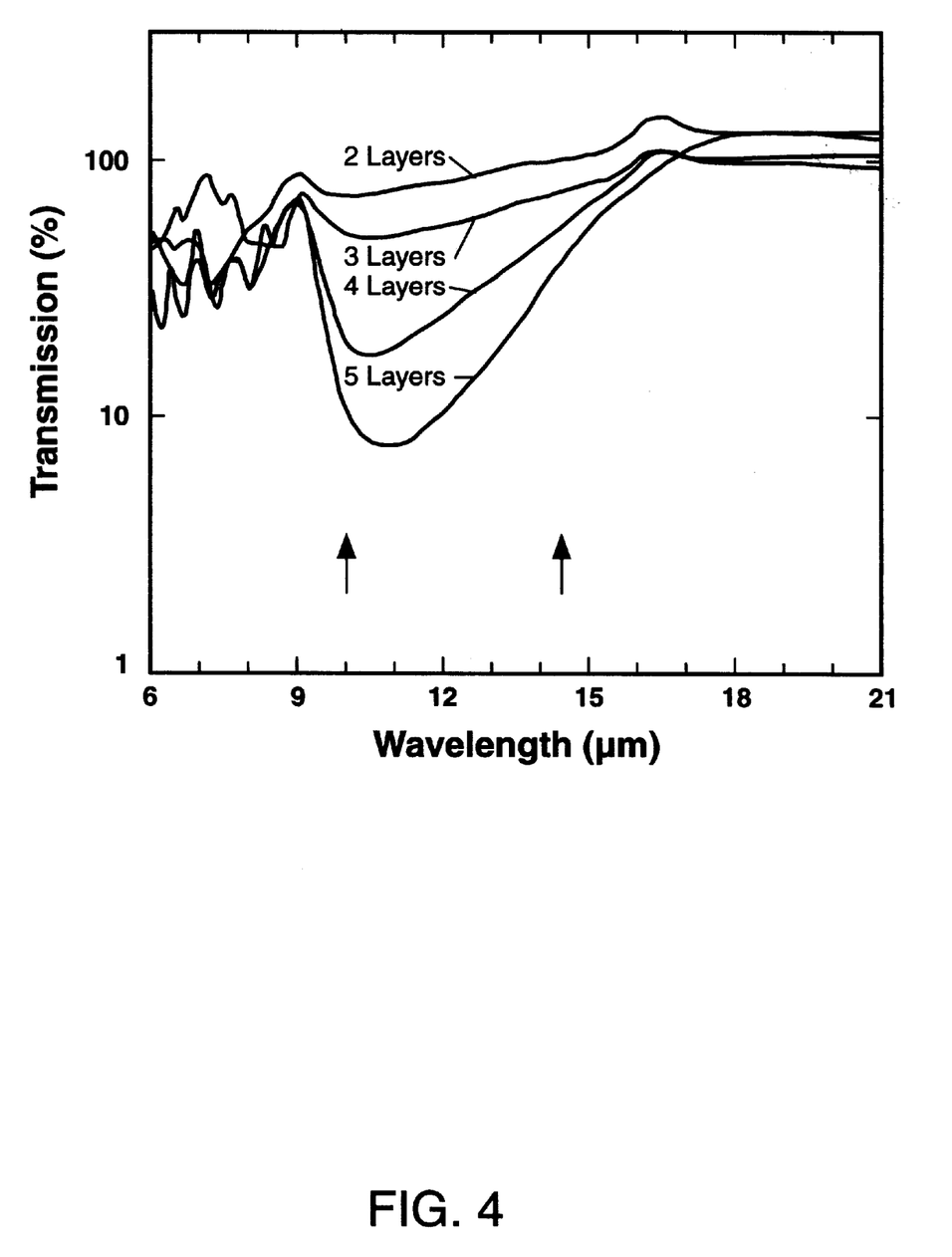
FIG. 4 shows a series of transmission curves measured with photonic bandgap structures with 2–5 stacked layers fabricated according to the present invention to illustrate formation of a photonic bandgap therein.

FIG. 4 shows a series of data curves on a logarithmic scale to illustrate the emergence of a photonic bandgap in a photonic bandgap structure 10 similar to that of FIG. 2b (i.e. with polysilicon elements 16 separated by air) as successive layers 14 are built up according to the present invention. The data curves in FIG. 4 show infrared light transmission through different photonic bandgap structures 10 having from 2–5 stacked layers 14 measured over a wavelength range of 6–21 $\mu$m. The measurements were made at room temperature using unpolarized infrared light from a heated silicon carbide resistor as an infrared light source. The infrared light was directed at normal incidence (i.e. perpendicular to the substrate 12 and layers 14) through the photonic bandgap structures 10 and supporting silicon substrate 12 to a backside pyroelectric infrared detector. This normal incidence direction ($\theta=0°$) corresponds to a <001> direction in the photonic bandgap structure (see FIG. 1). The backside or bottom surface of the substrate 12 was polished to better than a 0.3 $\mu$m surface finish to minimize scattering of the infrared light.

For the measurements of FIG. 4, 1×1 cm size samples were used from 6-inch silicon wafers 12. The infrared light was collimated with a 10° divergence angle to provide a ~3 mm spot size of the light incident onto each sample. The transmission curves in FIG. 4 were normalized using a system response curve obtained from a measurement of a bare silicon substrate, thereby eliminating effects due to substrate absorption, variations in light output of the source and response of the detector.

In FIG. 4, as the number of stacked layers 14 is increased from 2 layers to 5 layers, the buildup in the photonic bandgap produced by the elements 16 in the stacked layers 14 can be seen as an emerging dip in the infrared light transmission at wavelengths from about 10–14 $\mu$m due to a partial reflection of the incident infrared light (i.e. the transmission of the structure 10 decreases proportional to the number of layers 14 therein). The transmission dip corresponds to the photonic bandgap (i.e. a forbidden transmission band) and has a bandwidth $\Delta\lambda=4$ $\mu$m. Calculated positions for band edges of the photonic bandgap in FIG. 4 are indicated by the upward pointing arrows. Additional stacked layers 14 are expected to further reduce the infrared light transmission at wavelengths corresponding to the photonic bandgap.

From the transmission curves in FIG. 4, an attenuation constant, k, for the infrared light propagating through the photonic bandgap structure 10 can be calculated. The attenuation constant is wavelength dependent and has a maximum value at a wavelength of 11 $\mu$m that is 12 dB per unit cell, with the unit cell consisting of four stacked layers 14. Therefore, if the number of stacked layers 14 in the photonic bandgap structure 10 were to be increased to 8 (i.e. two unit cells of elements 16) then some 99% of the incident infrared light would be reflected off the structure 10, reducing the light transmission to about 1%.

A photonic bandgap structure 10 having a high reflectivity for incident light can be used to form a cavity with a high quality factor (Q) for confining light in one or more dimensions. A one-dimensional cavity formed from a pair of photonic bandgap structures 10 spaced apart by a multiple of one-half wavelength of light can be used as a high-Q Fabry-Perot resonator for filtering or analyzing the light. A band-rejection filter can be formed, for example, with a photonic bandgap structure 10 due to the photonic bandgap which prevents transmission of light over a predetermined wavelength range at all angles of incidence, $\theta$, of the light beam 100.

The provision of an optical gain medium (e.g. a semiconductor, organic dye, or solid-state gain medium) between the high-Q Fabry-Perot resonator formed by the spaced apart structures 10 can form a laser with suitable optical or electrical activation of the gain medium. Two- or three-dimensional resonators formed with photonic bandgap structures 10 fabricated according to the present invention can provide further confinement for light, thereby further increasing the Q of the resonators. Such two- or three-dimensional resonators have applications, for example, for forming "thresholdless" lasers or single-mode light-emitting diodes (LEDs). In the above applications of photonic bandgap structures 10 formed according to the present invention, the light can be propagated at any selected angle, $\theta$, and in particular either parallel or perpendicular to the substrate 12 and the stacked layers 14.

Figure 5:
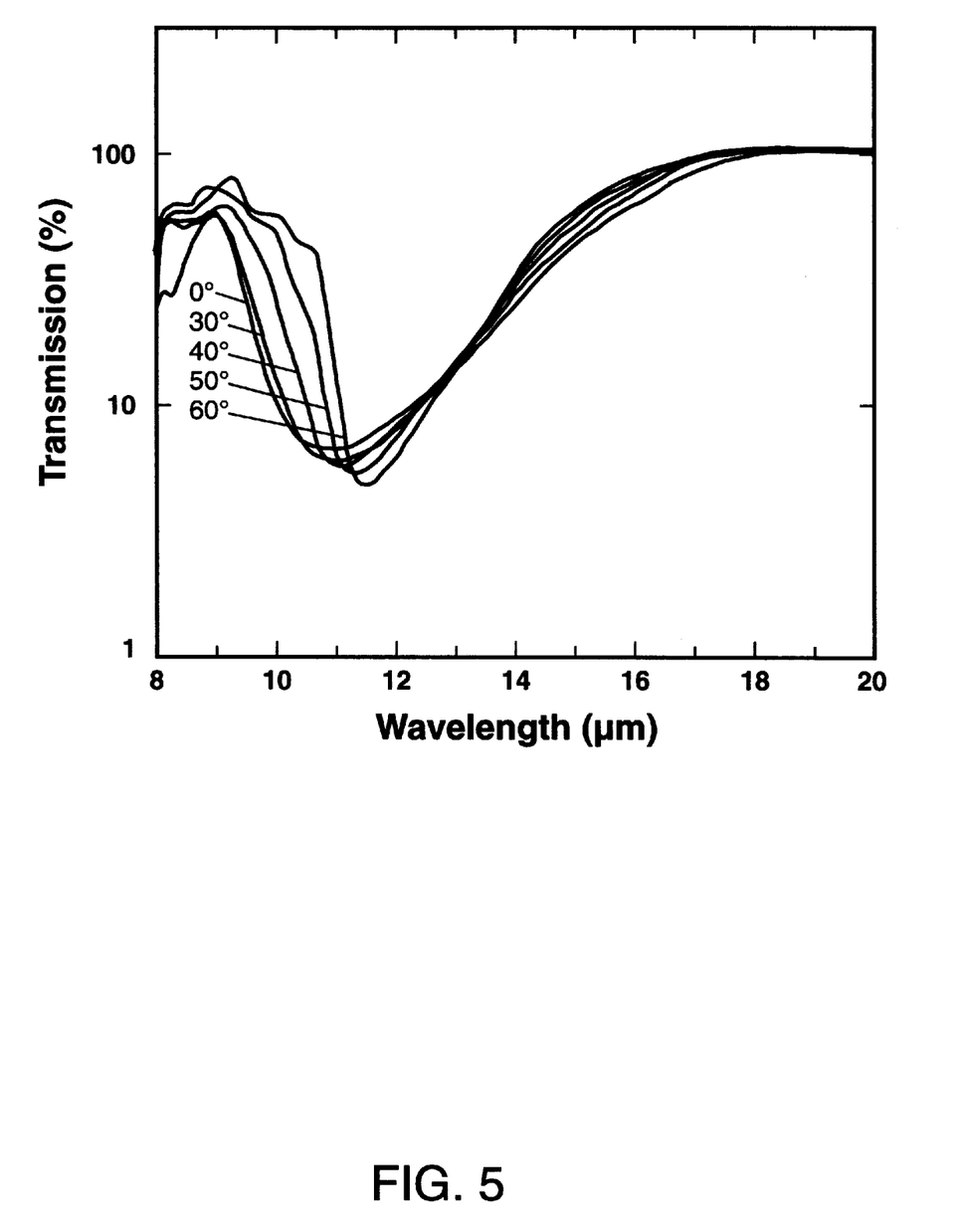
FIG. 5 shows transmission curves for a 5-level photonic bandgap structure with infrared light incident at different angles in the range of 0°–60° to illustrate the existence of the photonic bandgap at these different angles of incidence.

FIG. 5 shows a series of transmission curves measured for the 5-level photonic bandgap structure 10 of FIGS. 2a and 2b for different angles of incidence, $\theta$, of the infrared light beam 100 in the range of $\theta=0°$ to $\theta=60°$ as measured in free space. The angle of incidence, $\theta$, is measured along a plane defined by the surface normal and an axis of the elongate elements 16 as shown in FIG. 1 (i.e. in a direction between <001> and <110> axes of the structure 10). The photonic bandgap is expected to be present at all angles of incidence, $\theta$, with a theoretical minimum in transmission through the photonic bandgap structure 10 at $\theta=45°$ (i.e. half-way between the <001> and <110> axes). The angular-dependent transmission curves in FIG. 5 show a systematic narrowing of the photonic bandgap from $\Delta\lambda=4$ $\mu$m to $\Delta\lambda=3$ $\mu$m as the angle of incidence, $\theta$, is increased from 0° to 60°.

FIG. 6 shows schematically a perspective view of a third example of a photonic bandgap structure 10 according to the present invention. In FIG. 6, the spaced elements 16 are in the form of cubic "bits" (also termed photonic atoms) comprised of one of the first or second materials, with the other of the first or second materials forming the spacer material 18 that surrounds and separates the elements 16.

During fabrication of the photonic bandgap structure 10 in the example of FIG. 6, a plurality of "impurity"0 elements 30 have been formed at predetermined locations in the structure 10 to replace selected elements 16.

The term "impurity" as applied to the elements 30 arises from an analogy to a crystal wherein impurity atoms are doped (e.g. a doped semiconductor crystal) to alter properties of the crystal to advantage. These impurity elements 30 comprise a third material having an index of refraction, $n_3$, different from the index of refraction of the material wherefrom the elements 16 are formed. As an example, if the elements 16 comprise polysilicon and the spacer material comprises silicon dioxide, then the impurity elements can comprise silicon dioxide or silicon nitride. Tantalum oxide ($Ta_2O_5$) can be used to form impurity elements 30 to provide an electro-optic effect for certain embodiments of the photonic bandgap structure 10 according to the present invention. In some embodiments of the present invention, impurity elements 30 can be formed by simply omitting one or more of the spaced elements 30 and leaving the spacer material 18 or air in place thereof.

Although in the example of FIG. 6, the elements 16 and 30 are shown as being cubic, the elements 16 and 30 can be cylindrical, elliptical or polygonal. When elongate elements 16 are used to form the photonic bandgap structure 10 as in the example of FIG. 1, elongate impurity elements 30 can be substituted for one or more of the elements 16 during fabrication of the structure 10 as described heretofore. An optimum or preferred shape and optimum placement locations for the impurity elements 30 for a particular photonic bandgap structure 10 can be learned from practice of the present invention.

In the absence of any impurity elements 30, a regular periodicity of the spaced elements 16 generates wavelength or frequency gaps (i.e. a photonic bandgap) in a transmission spectrum of the photonic bandgap structure 10 as shown in FIG. 4. The presence of impurity elements 30 in the structure 10 can disturb an otherwise regular periodicity of the spaced elements 16 thereby altering a propagation characteristic of light traversing the structure 10 and allowing a substantial transmission of the light through the structure 10 at a predetermined wavelength, wavelength range or angle of incidence for which the structure 10 would otherwise not be transmissive. Thus, the impurity elements 30 can be used to "dope" the photonic bandgap structure 10 to advantage for particular applications.

The matter set forth in the foregoing description and accompanying drawings is offered by way of illustration only and not as a limitation. Other applications and variations of the present invention will become evident to those skilled in the art. The actual scope of the invention is intended to be defined in the following claims when viewed in their proper perspective based on the prior art.

What is claimed is:

1. A method for fabricating a photonic bandgap structure, comprising steps for:
    (a) forming a first layer of spaced elements of the photonic bandgap structure; and
    (b) planarizing the first layer of spaced elements by chemical-mechanical polishing.

2. The method of claim 1 further comprising steps for:
    (a) forming a second layer of spaced elements above the first layer, with the spaced elements in the second layer being arranged differently from the spaced elements in the first layer; and
    (b) planarizing the second layer of spaced elements by chemical-mechanical polishing.

3. The method of claim 2 wherein the substrate comprises silicon.

4. The method of claim 1 wherein the steps for forming the first and second layers of spaced elements comprise steps for depositing and patterning each layer.

5. The method of claim 4 wherein the depositing and patterning steps comprise:
    (a) depositing a first material;
    (b) patterning the first material by etching to form an array of shaped openings therein; and
    (c) depositing a second material to cover, at least in part, the first material and to overfill at least a majority of the shaped openings in the array.

6. The method of claim 5 wherein one of the first and second materials is used to form the spaced elements.

7. The method of claim 5 wherein the first and second materials are selected from the group consisting of polycrystalline silicon, amorphous silicon, silicon nitride, silicon dioxide and silicate glass.

8. The method of claim 5 wherein each deposition step comprises chemical vapor deposition, and each etching step comprises reactive ion etching.

9. A method for fabricating a photonic bandgap structure, comprising steps for:
    (a) forming a plurality of stacked layers of spaced elements of the photonic bandgap structure; and
    (b) planarizing each layer of spaced elements in the plurality of stacked layers by chemical-mechanical polishing after formation of that layer.

10. The method of claim 9 wherein the plurality of stacked layers of spaced elements are formed on a substrate.

11. The method of claim 10 wherein the substrate comprises silicon.

12. The method of claim 10 wherein the step for forming the plurality of stacked layers of spaced elements comprises steps for depositing and patterning each layer in the plurality of stacked layers.

13. The method of claim 12 wherein the depositing and patterning steps comprise:
    (a) depositing a first material over the substrate;
    (b) patterning the first material by etching to form an array of shaped openings therein; and
    (c) depositing a second material to cover, at least in part, the first material and to overfill at least a majority of the shaped openings in the array.

14. The method of claim 13 wherein one of the first and second materials is used to form the spaced elements.

15. The method of claim 13 further comprising a step for rotating the array of shaped openings in each succeeding layer of the plurality of stacked layers at an angle to the array of shaped openings in the underlying layer.

16. The method of claim 15 wherein the angle is substantially equal to 90 degrees.

17. The method of claim 15 further comprising a step for laterally offsetting the array of shaped openings in every other layer by substantially one-half of a spacing between adjacent shaped openings in the array.

18. The method of claim 13 wherein the first and second materials are selected from the group consisting of polycrystalline silicon, amorphous silicon, silicon nitride, silicon dioxide and silicate glass.

19. The method of claim 13 wherein each deposition step comprises chemical vapor deposition.

20. The method of claim 13 wherein the patterning step further comprises a step for photolithographic masking prior to etching.

21. The method of claim 13 wherein the etching comprises reactive ion etching.

22. The method of claim 13 wherein the planarization step comprises chemically-mechanically polishing the second material down at least to the underlying first material.

23. The method of claim 13 wherein one of the first and second materials is used to form the spaced elements, and further comprising a step for removing, at least in part, the other of the first and second materials by selective etching.

24. The method of claim 23 wherein the spaced elements are vertically interconnected for support.

25. The method of claim 13 further comprising a step for annealing the deposited first and second materials for reducing stress therein.

26. The method of claim 13 further comprising a step for depositing a third material to overfill a minority of the shaped openings not overfilled by the second material, the third material having an index of refraction different from the index of refraction of the second material.

27. The method of claim 13 wherein the shaped openings have substantially vertical sidewalls.

28. The method of claim 13 wherein the shaped openings are elongate.

29. The method of claim 13 wherein the shaped openings have substantially equal lateral dimensions.

30. A method for fabricating a photonic bandgap structure on a substrate, comprising steps for:

(a) depositing a layer of a first material and patterning the layer to provide an array of shaped openings therein extending downward through the layer;

(b) depositing a second material to overfill at least a majority of the shaped openings in the array;

(c) planarizing the second material by chemical-mechanical polishing and thereby removing the second material at least down to the underlying first material; and (d) repeating the sequence of steps (a)–(c) a plurality of times to build up the photonic bandgap structure.

31. The method of claim 30 wherein the step of repeating the sequence of steps (a)–(c) further comprises a step for offsetting or rotating the array of shaped openings in each successive layer of the first material.

32. The method of claim 31 wherein the step for offsetting or rotating the array of shaped openings comprises laterally offsetting the array of shaped openings by a distance substantially equal to one-half of a spacing between adjacent shaped openings in the array.

33. The method of claim 31 wherein the step for offsetting or rotating the array of shaped openings comprises rotating the array of shaped openings at an angle to the shaped openings formed in an underlying layer of the photonic bandgap structure.

34. The method of claim 33 wherein the angle is substantially equal to 90 degrees.

35. The method of claim 30 wherein the substrate comprises silicon.

36. The method of claim 30 wherein the first and second materials are selected from the group consisting of polycrystalline silicon, amorphous silicon, silicon nitride, silicon dioxide and silicate glass.

37. The method of claim 30 wherein each deposition step comprises chemical vapor deposition.

38. The method of claim 30 wherein the patterning step comprises steps for photolithographic masking and etching.

39. The method of claim 38 wherein the etching comprises reactive ion etching.

40. The method of claim 30 further comprising a step for annealing the first and second materials for reducing stress therein.

41. The method of claim 30 wherein one of the first or second materials forms a plurality of spaced elements of the photonic bandgap structure.

42. The method of claim 41 further comprising a step for removing by selective etching the other of the first or second materials not forming the spaced elements of the photonic bandgap structure.

43. The method of claim 42 wherein the spaced elements of the photonic bandgap structure remaining after the selective etching step are interconnected for support.

44. The method of claim 30 further comprising a step for depositing a third material to overfill a minority of the shaped openings not overfilled by the second material, the third material having an index of refraction different from the index of refraction of the second material.

45. The method of claim 30 wherein the shaped openings have substantially vertical sidewalls.

46. The method of claim 30 wherein the shaped openings are elongate.

47. The method of claim 30 wherein the shaped openings have substantially equal lateral dimensions.

\* \* \* \* \*